(12) United States Patent
Kim et al.

(10) Patent No.: US 8,671,549 B2
(45) Date of Patent: Mar. 18, 2014

(54) TRANSMISSION MOUNT TYPE OF SIDE ASSEMBLING

(75) Inventors: Hyuk Kim, Siheung-shi (KR); Yong-Jin Kim, Kwangmyong-shi (KR); Seung-Won Kim, Seoul (KR); Jun-Haeng Heo, Seoul (KR); Kong-Sup Jung, Hwasung-shi (KR); Jong-Hoon Lee, Hwasung-shi (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 13/222,917

(22) Filed: Aug. 31, 2011

(65) Prior Publication Data
US 2012/0084965 A1    Apr. 12, 2012

(30) Foreign Application Priority Data
Oct. 7, 2010    (KR) .................. 10-2010-0097661

(51) Int. Cl.
*F16M 11/04* (2006.01)
*B21D 53/88* (2006.01)

(52) U.S. Cl.
USPC ........ 29/525.11; 248/674; 248/636; 29/897.2

(58) Field of Classification Search
USPC .............. 29/525.11, 888.01, 898.07, 898.08; 248/637, 638, 646, 658, 671, 673, 676; 474/28, 64, 67, 71; 475/165, 166, 167, 475/171
See application file for complete search history.

(56) References Cited

U.S. PATENT DOCUMENTS

2007/0131469 A1*    6/2007    Kim ....................... 180/293

FOREIGN PATENT DOCUMENTS

| JP | 10-315789 A | 12/1998 |
|---|---|---|
| JP | 10-338159 A | 12/1998 |
| JP | 2003-326983 A | 11/2003 |
| JP | 2005-47363 A | 2/2005 |
| JP | 2009-274491 A | 11/2009 |
| KR | 10-2006-0071213 A | 6/2006 |

* cited by examiner

*Primary Examiner* — Alexander P Taousakis
*Assistant Examiner* — Lee Holly
(74) *Attorney, Agent, or Firm* — Morgan, Lewis & Bockius LLP

(57) ABSTRACT

A transmission mount type of side assembling includes a cylindrical insulator; a core having a plurality of longitudinal holes and inserted in the insulator; a side stopper having a support connected to one end of the core in contact with the inner side of the insulator and a protrusion protruding outside the insulator from the support; a cylindrical case accommodating the core, the side stopper, and the insulator; and a plurality of bolts that is longer than the case and inserted through holes in the core and the side stopper from a side to protrude outside the case, such that it can simplify the assembly process of fastening a transmission to a car body and reduce the manufacturing cost, without changing the existing manufacturing line, and ensure safety in assembly.

3 Claims, 8 Drawing Sheets

TRANSMISSION MOUNT TYPE OF SIDE ASSEMBLING

CROSS-REFERENCE TO RELATED APPLICATIONS

The present application claims priority of Korean Patent Application Number 10-2010-97661 filed Oct. 7, 2010, the entire contents of which application is incorporated herein for all purposes by this reference.

BACKGROUND OF INVENTION

1. Field of Invention

The present invention relates to a transmission mount, and more particularly, to a side-assembly type of transmission mount that simplifies the process of combining a transmission with a car body and reduces manufacturing cost.

2. Description of Related Art

Transmissions of vehicles are apparatuses transmitting power from the engine to the driving wheels by changing the torque and speed in accordance with the traveling states of the vehicles, and directly connected to the crankshaft of the engine by the clutch. Therefore, the transmissions generate a large amount of vibration and noise due to its mechanical operation and the operation of the engine.

Therefore, the transmission is mounted on the car body frame by a transmission mount to improve riding comfort for the passengers in the vehicle by minimizing transmission of vibration and noise which are generated from the engine and the transmission to the car body.

A method of mounting the transmission on the car body frame depends on the structure of the subframe of the vehicle. As shown in FIG. 1A, in a 4-point support type, that is, a #-type subframe structure, a power train is fixed on the subframe by fastening front and rear roll mounts and then decked to the car body, and the assembly is finished by fastening an engine mount and a transmission mount in the next process, as shown in FIG. 1B.

On the contrary, as shown in FIG. 2A, in a 3-point support type, that is, an H-type subframe structure, the assembly is finished by simultaneously mounting an engine mount and a transmission mount, with only a rear roll rod temporarily fastened and a power train disposed on a subframe and not fixed, as shown in FIG. 2B.

Recently, the 3-point type of H-type subframe and mount are widely used even for high-torque engines in order to reduce manufacturing cost and weight of vehicles, such that it is required to change the manufacturing line for the #-type subframe method into the manufacturing line for the H-type subframe method. Accordingly, a large amount of investment is made to modify the line equipment and workers for assembly are further required for mixed manufacturing of the frames.

Further, the engine and transmission mounts are fastened to the car body by bolts from above in the related art, as shown in FIG. 3A, such that a worker fastens them, on the vehicle, and accordingly, a safety accident is likely to occur due to the work on a table at high position, as shown in FIG. 3B. Further, work on the engine is not finished within a limited time in some factories, such that it is required to drastically change the manufacturing line.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a side-assembly type of transmission mount that can achieve convenient assembly and ensure safety in assembly while not changing the existing manufacturing line.

Various aspects of the present invention provide for a transmission mount type of side assembling including a cylindrical insulator, a core having a plurality of longitudinal holes and inserted in the insulator, a side stopper having a support connected to one end of the core in contact with the inner side of the insulator and a protrusion protruding outside the insulator from the support, a cylindrical case accommodating the core, the side stopper, and the insulator, and a plurality of bolts that is longer than the case and inserted through holes in the core and the side stopper from a side to protrude outside the case.

Various aspects of the present invention provide for a transmission mount type of side assembling including a cylindrical insulator, a core having a plurality of longitudinal holes and a space cut in the width direction and inserted in the insulator, a plate stopper inserted in the space of the core, a cylindrical case accommodating the core and the insulator, and a plurality of bolts that is longer than the case and inserted through holes in the core and the plate stopper from a side to protrude outside the case.

Further, transmission mount type of side assembling may further include transmission bracket with the upper portion directly connected with the protruding bolts and the lower portion connected to a transmission.

Further, the core may be made of aluminum and the side stopper may be made of steel.

According to various aspects of the present invention, it is possible to use the manufacturing line without changing the existing line, by making it possible to fix a transmission mount from a side, when applying a 3-point support type of H-shaped subframe, which is very advantageous in reducing manufacturing cost and weight, to a manufacturing line for a #-shaped subframe using 4-point support type in the related art. Therefore, it is possible to reduce an investment for providing a working table for mount assembly, a chassis marriage line, a chassis mode supply conveyer, and utility and remodeling equipment.

Further, since a worker does not need to climb up on a table at a high position in order to fasten a transmission mount to the subframe of the car body, it is possible to prevent safety accident due to a work at a high position.

Further, even if #-shaped subframes and H-shaped subframes are simultaneously manufactured in one factory, the method of fastening a mount can be used, such that additional workers are not required for the assembly and about four workers can be saved for each line.

Further, it is possible to prevent line shut-down, which is caused in remodeling the existing equipment, and to prevent cost loss by preventing reduction of operating rate due to new equipment and reducing the area of a factory.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1A:
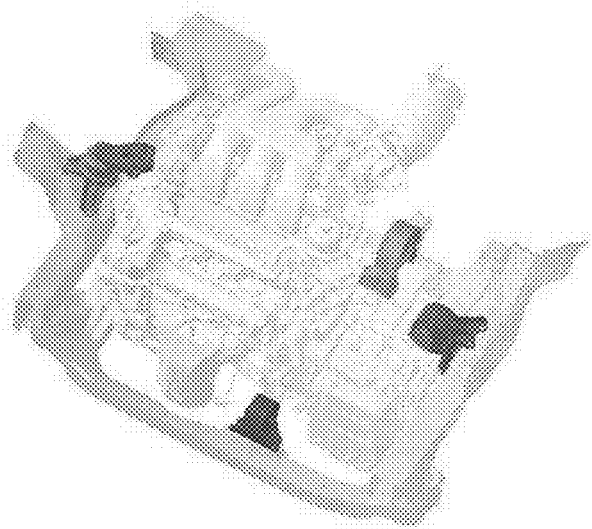
FIG. 1A is a perspective view showing a 4-point support type of subframe and a mount.
Figure 1B:
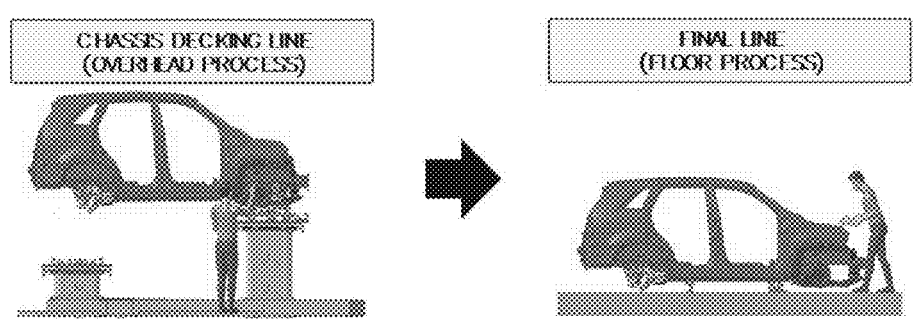
FIG. 1B is a schematic view showing a process of fastening a mount to a 4-poiont support type of subframe.
Figure 2A:
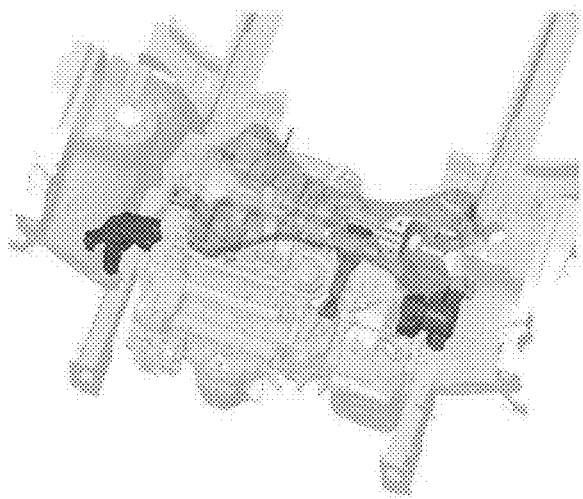
FIG. 2A is a perspective view showing a 3-point support type of subframe and a mount.
Figure 2B:
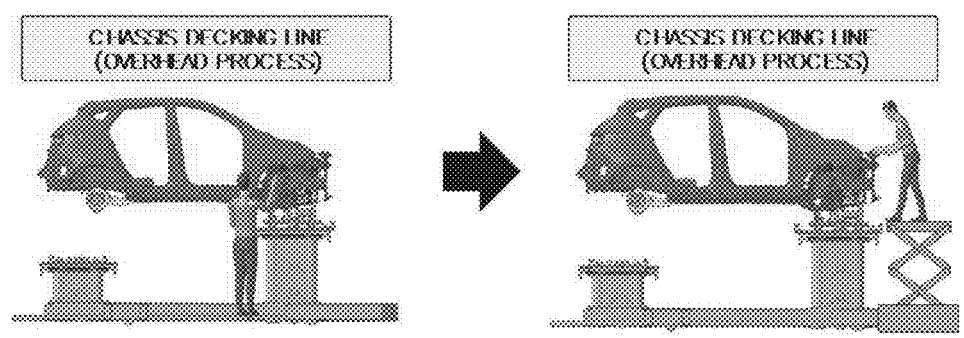
FIG. 2B is a schematic view showing a process of fastening a mount to a 3 point support type of subframe.
Figure 3A:
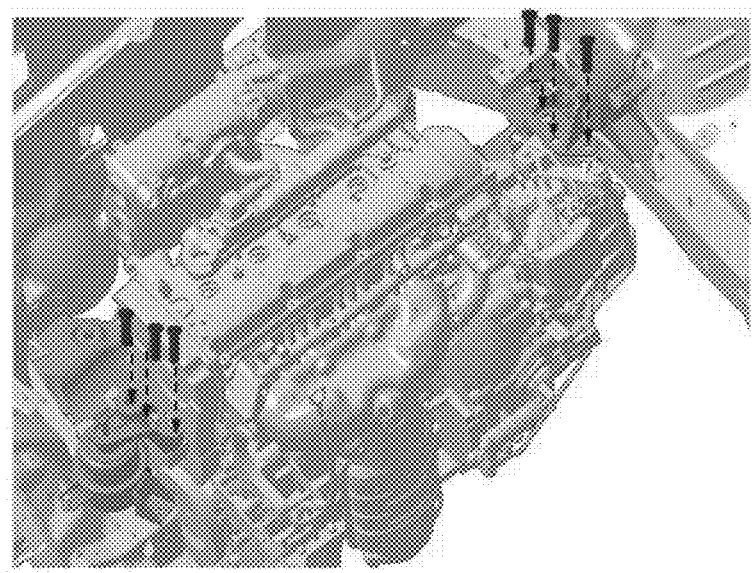
FIG. 3A is a perspective view when bolts are inserted from above to fasten a mount to a 3-point support type of subframe used in the related art.
Figure 3B:
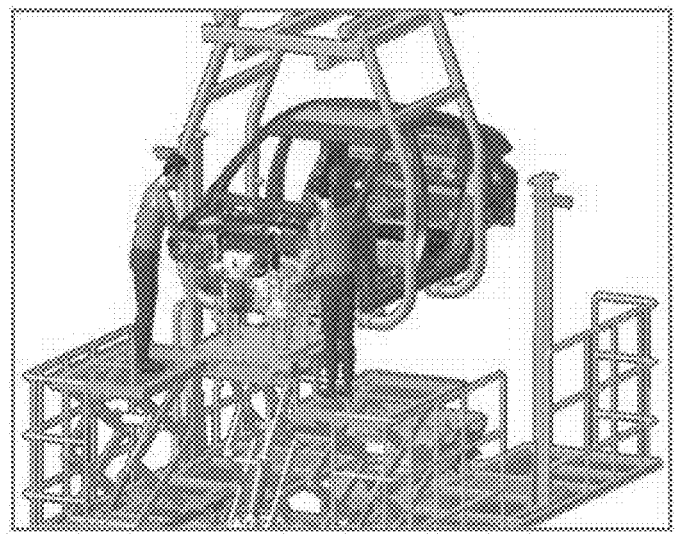
FIG. 3B is a schematic view showing a process of fastening a mount to a 3-poiont support type of subframe used in the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

A side-assembly type of transmission mount according to various embodiments of the present invention includes a cylindrical insulator 10, a core 20 having a plurality of longitudinal holes and inserted in the insulator 10, a side stopper 30 having a support 31 connected to one end of the core 20 in contact with the inner side of the insulator 10 and a protrusion 32 protruding outside the insulator 10 from the support 31, a cylindrical case 50 accommodating the core 20, the side stopper 30, and the insulator 10, and a plurality of bolts 60 that is longer than the case 50 and inserted through holes in the core 20 and the side stopper 30 from a side to protrude outside the case 50.

Figure 4:
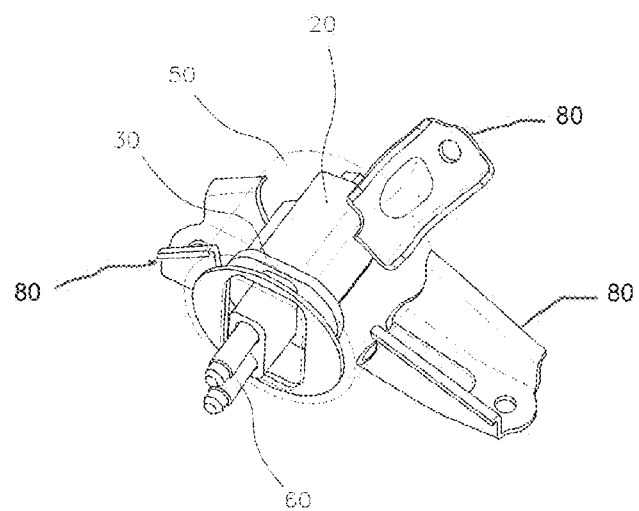
FIG. 4 is a perspective view of an exemplary embodiment of the present invention.
Figure 5:
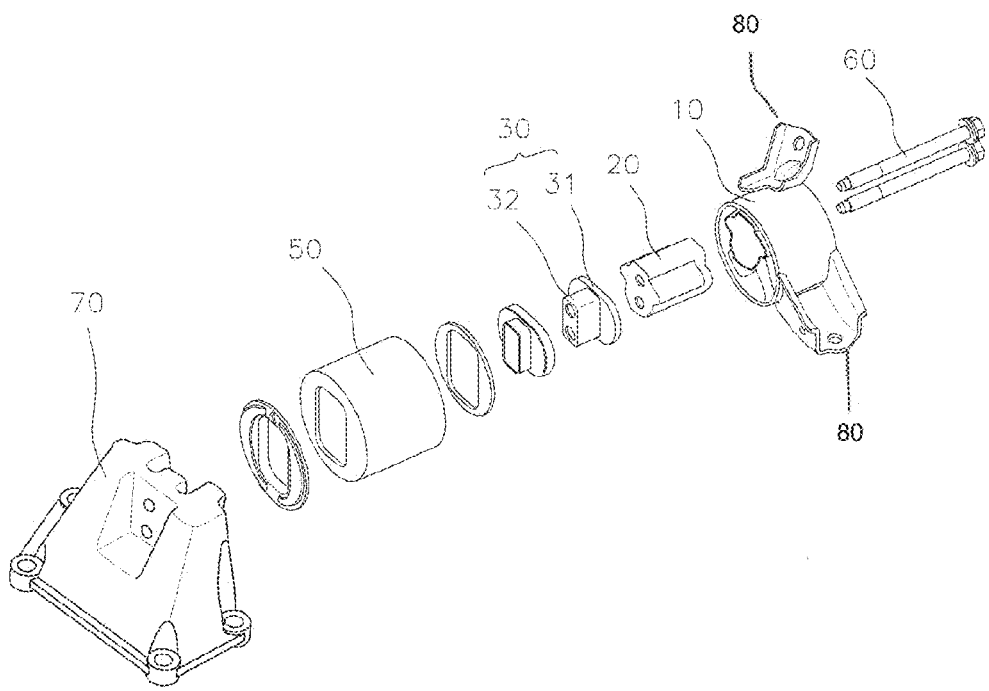
FIG. 5 is an exploded perspective view of an exemplary embodiment of the present invention.

That is, as shown in FIGS. 4 and 5, a connecting portion 80 is formed around the case 50 to be fixed to the subframe of a car body and the insulator 10, the core 20, and the side stopper 30 are positioned inside the case 50.

The insulator 10 is usually made of rubber to reduce vibration and noise that are transmitted from the transmission and a space is formed therein to disposing the core 20.

The core 20 is formed in a column shape having a curved cross-section and inserted in the space having the same cross-section in the insulator 10, such that it transmits the vibration and noise transmitted from the transmission to the insulator 10 to attenuate them.

The holes are longitudinally formed through the core 20 and the bolts 60 are inserted in the holes.

The side stopper 30 is connected to one side of the core 20. The side stopper 30 is provided to complement shock performance when excessive shock and vibration are applied to the car body and the transmission and, in various embodiments, may be formed in an inverse T-shape with the support 31 having a plate shape being in contact with the inner side of the insulator 10 and the protrusion 32 protruding outside the case 50 from the support 31.

That is, the bolts 60 can be guided by the protrusion 32 and the protrusion 32 can be in contact with the transmission, thereby complementing the shock performance.

Similar to the core 20, the side stopper 30 has holes in the number and position corresponding to the holes in the core 20, such that the bolts 60 can be connected through the side stopper 30.

Therefore, in various embodiments, it may be preferable that the core 20 is formed by casting aluminum to reduce the weight and the side stopper 30 is formed by forging steel to increase strength.

In various embodiments, it may be preferable that the bolts 60 passing through the core 20 and the side stopper 30 are longer than the entire length of the case 50 and protrude outside the case 50, and it may be preferable that they are inserted from a side to be horizontally positioned.

The bolts 60 are inserted from a side member of the car body to the transmission and can be directly fastened to a transmission bracket 70, because they protrude at a predetermined length outside the case 50, after being completely fastened.

That is, the side-assembly type of transmission mount according to various embodiments of the present invention further includes the transmission bracket 70 with the upper portion directly connected with the protruding bolts 60 and the lower portion connected to the transmission, such that it is possible to fix the transmission to the car body and transmits vibration from the transmission to the mount, thereby attenuating the vibration.

In transmission mounts used in the related art, core and a connecting portion is combined first and then the connecting portion and the transmission are combined by inserting bolts from above, such that the weight and manufacturing cost of the vehicle are increased and a safety accident of workers is caused.

However, since the bolts 60 are directly connected to the transmission bracket 70 through the core 20 and the side stopper 30 from a side of the car body, the manufacturing cost is reduced and the working process becomes very easy.

Figure 6A:
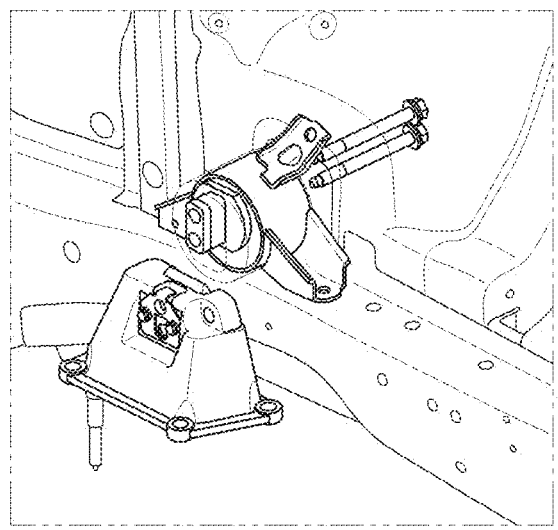
FIGS. 6A to 6C are perspective view showing an exemplary process of assembly according to the present invention.
Figure 6B:
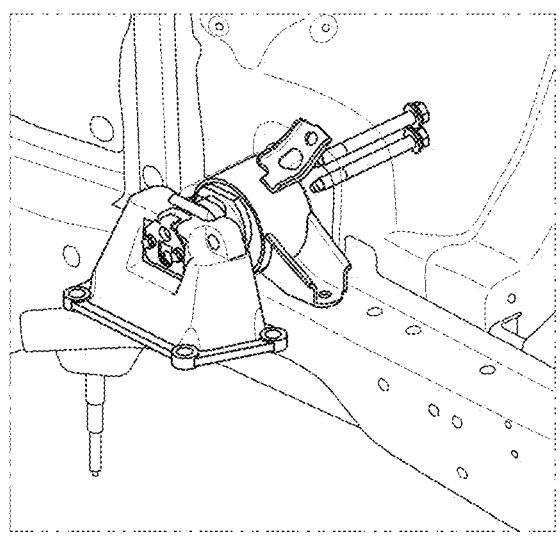
Figure 6C:
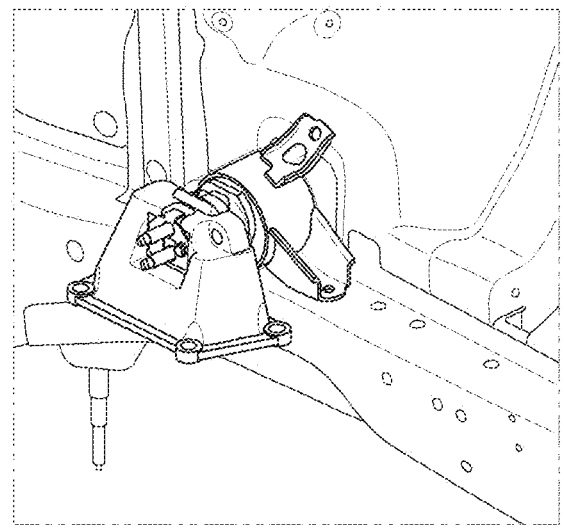

As shown in FIGS. 6A to 6C, the case 50, the core 20, and the side stopper 30 are fastened to the subframe of the car body and the transmission bracket 70 is positioned to correspond to the side stopper 30, thereafter, the bolts 60 are inserted from a side, that is, the car body, thereby finishing the assembly.

In particular, since the transmission mount can be directly fastened from a side of the vehicle even in a factory where vehicles equipped with the #-type subframe are manufactured, it does not need to provide a specific table for fastening the mount and it is possible to preclude a safety accident due to high-position working of workers.

Further, it is possible to save an investment for changing the manufacturing line, it does not need to dispose additional workers for assembly due to mixed production of the subframes, and it is possible to prevent light shut-down due to remodeling the equipment, such that it is possible to achieve economic profits in each case.

Figure 7:
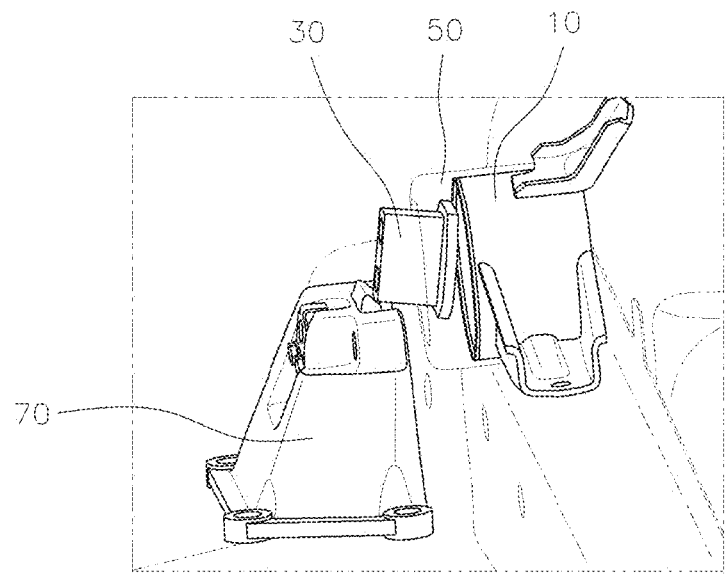
FIG. 7 is a perspective view showing a problem that may be generated in an exemplary embodiment process of assembly according to the present invention.

However, in the process of positioning and decking the transmission bracket 70 before inserting the bolts 60 to fasten the transmission mount, as described above, as shown in FIG. 7, when the side stopper 30 and the transmission bracket 70 are not aligned at the accurate position, the side stopper 30 is deviated from the core 20 and the holes of them do not correspond to each other, and accordingly, it is impossible to fully insert the bolts 60 from a side.

Figure 8:
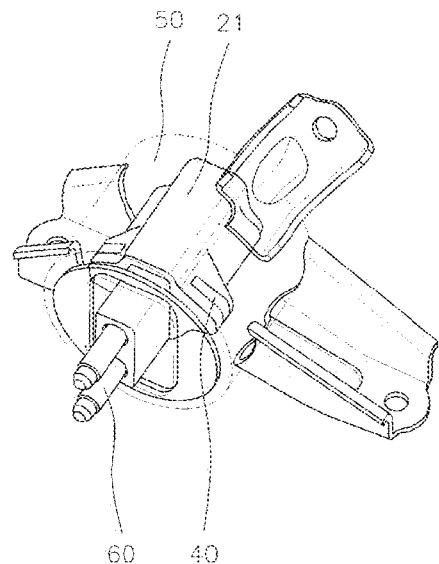
FIG. 8 is a perspective view showing another exemplary embodiment of the present invention.
Figure 9:
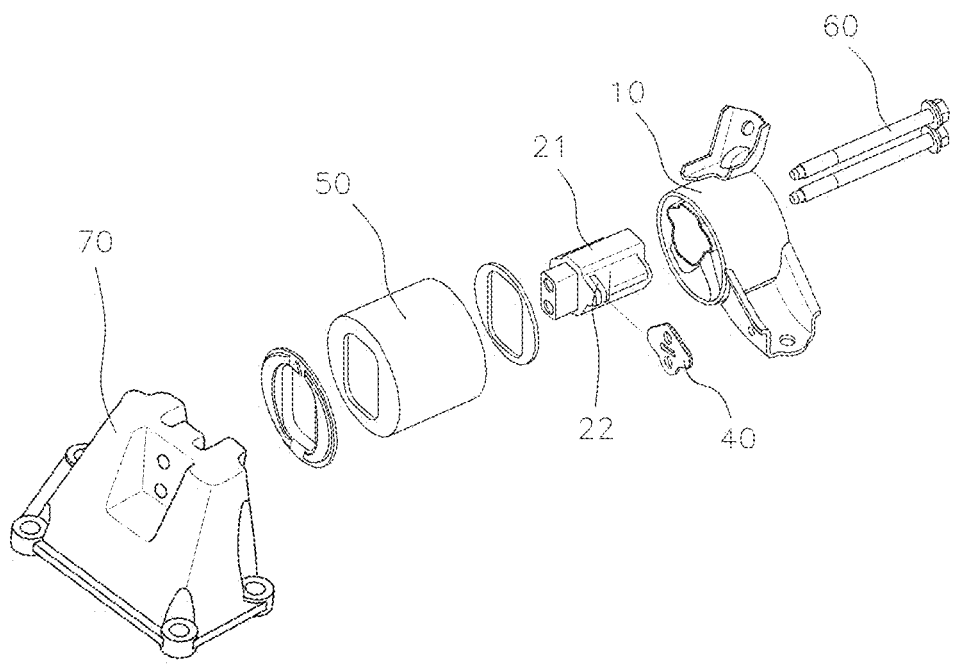
FIG. 9 is an exploded perspective view of another exemplary embodiment of the present invention.
Figure 10A:
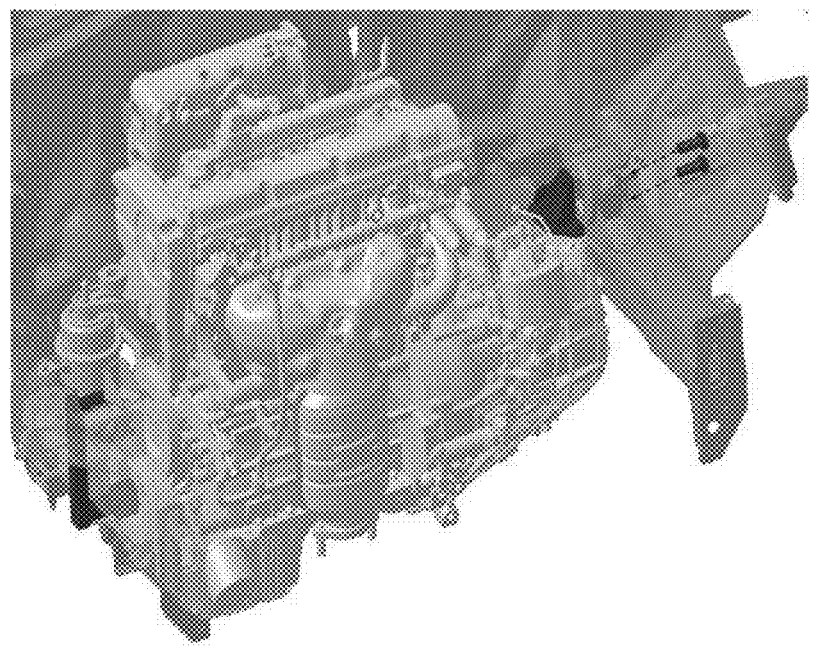
FIG. 10A is a perspective view when an exemplary mount is fastened to a 3-point support type of subframe according to the present invention, from a side.
Figure 10B:
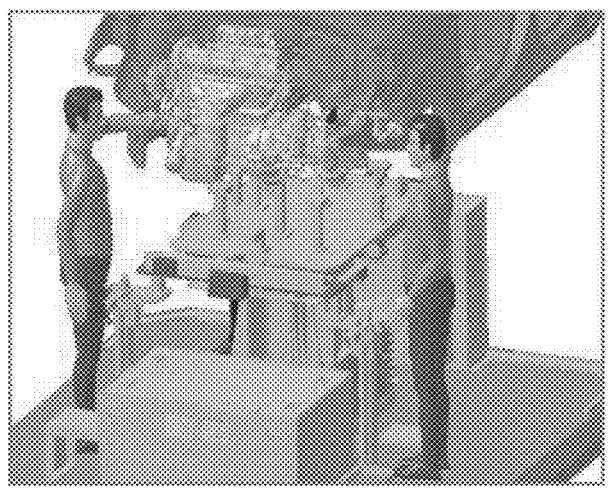
FIG. 10B is a schematic view showing an exemplary process of fastening a mount to a 3-point support type of subframe according to the present invention.

Therefore, another exemplary embodiment of the present invention is shown in FIGS. 8 and 9, in order to prevent this problem.

That is, the insulator 10, case 50, bolts 60, and transmission bracket 70 are formed in the same as that described above, and a core 21 and a plate stopper 40 are different.

The core 21 has a plurality of longitudinal holes and is inserted in the insulator 10, in an integral type to protrude outside the case 50.

Accordingly, similar to the side stopper 30, it is possible to complement shock performance when excessive shock and vibration are applied to the car body and the transmission.

Further, in various embodiments, it may be preferable that a space 22 cut in the width direction is defined in the core 21 and the plate stopper 40 is inserted in the space 22 of the core 21.

As described above, when the plate stopper 40 is inserted in the core 21, the stopper is not separated by shock in inserting the bolts 60, and the transmission bracket 70 and the bolts 60 can be more easily combined.

Further, in various embodiments, it may be preferable that the core 21 is made of aluminum and the plate stopper 40 is made of steel. It may be preferable that the stopper is made of steel to complement strength and inserted in the space 22 of the core 21, because the core 21 that is in contact with the case 50 is made of aluminum and may be easily damaged by shock.

Therefore, the side stopper 30 is prevented from being deviated in the assembly process, such that the assemblage is improved. Further, the deviation load that the transmission mount carries in a collision increases by about 10%, from 60 kN to 66 kN and it is possible to further reduce the weight and manufacturing cost.

For convenience in explanation and accurate definition in the appended claims, the terms upper or lower, rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A transmission-mount/side-assembly comprising:
   a cylindrical insulator;
   a core having a plurality of longitudinal holes and a space cut in the width direction and inserted in the insulator;
   a plate stopper inserted in the space of the core;
   a cylindrical case accommodating the core and the insulator; and
   a plurality of bolts that is longer than the case and inserted through holes in the core and the plate stopper from a side to protrude outside the case.

2. The transmission-mount/side-assembly method according to claim 1, further comprising a transmission bracket with the upper portion directly connected with the protruding bolts and the lower portion connected to a transmission.

3. The transmission-mount/side-assembly according to claim 1, wherein the core is made of aluminum and the plate stopper is made of steel.

* * * * *